United States Patent [19]
Tanghe

[11] Patent Number: 5,714,076
[45] Date of Patent: Feb. 3, 1998

[54] PROCESS FOR PREVENTING THE FORMATION OF BLACK SPOTS ON THE WALLS OF UNDERGROUND WATER RESERVOIRS

[75] Inventor: Hans Tanghe, Oudenaarde, Belgium

[73] Assignee: Plavina & Cie (Société en Nom Collectif), Brussels, Belgium

[21] Appl. No.: 719,870

[22] Filed: Sep. 25, 1996

[30] Foreign Application Priority Data

Oct. 6, 1995 [BE] Belgium .................. 09500828

[51] Int. Cl.$^6$ .................................................. C02F 1/52
[52] U.S. Cl. .................. 210/723; 210/702; 210/912
[58] Field of Search .................. 210/702, 712, 210/719, 721, 723, 757, 758, 912

[56] References Cited

U.S. PATENT DOCUMENTS

| | | | |
|---|---|---|---|
| 2,220,667 | 9/1940 | Travis | 210/723 |
| 3,544,476 | 12/1970 | Aiba et al. | 210/723 |
| 4,070,281 | 1/1978 | Tagashira et al. | 210/664 |
| 4,102,784 | 7/1978 | Schlauch | 210/716 |
| 4,414,115 | 11/1983 | The | 210/665 |
| 5,279,748 | 1/1994 | Hackett | 210/757 |

FOREIGN PATENT DOCUMENTS 0394541  10/1990  European Pat. Off. .

Primary Examiner—Peter A. Hruskoci
Assistant Examiner—Betsey J. Morrison
Attorney, Agent, or Firm—Spencer & Frank

[57] ABSTRACT

A method for preventing the formation of black marks on the walls of sunken pools containing water contaminated by copper ions, which consists in treating the water using an effective amount of a metal sulfide having a water solubility at least equal to the solubility of copper sulfide. The treatment reduces the concentration of copper ions in the water and prevents the formation of black marks on the walls.

9 Claims, 1 Drawing Sheet

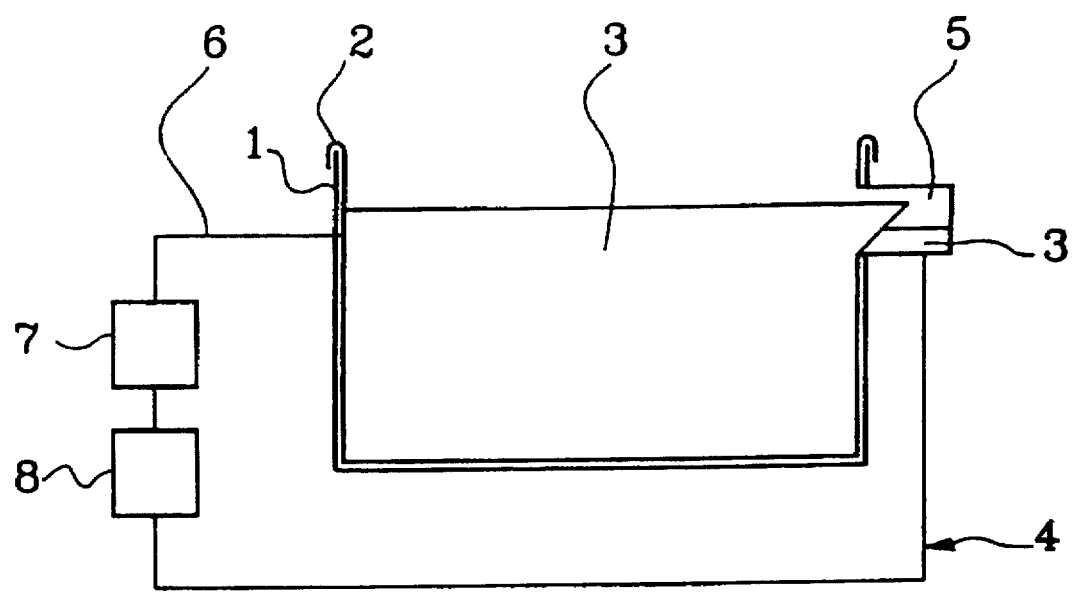

PROCESS FOR PREVENTING THE FORMATION OF BLACK SPOTS ON THE WALLS OF UNDERGROUND WATER RESERVOIRS

FIELD OF THE INVENTION

The invention relates to a method for preventing the formation of black marks on the walls of sunken pools containing water contaminated by copper ions.

TECHNOLOGY REVIEW

The walls of sunken pools, in particular ornamental ponds and swimming pools, are often of light color. Over time, black or grayish marks sometimes appear on the walls of these pools which contain water. These marks are generally indelible, even after they have been treated using a concentrated acid. Chemical analysis of the marks shows that they often consist of deposits comprising copper, generally in the form of copper sulfide.

These copper sulfide deposits may, in particular, be due to a reaction between the copper ions present in the water in the pool and hydrogen sulfide formed in the ground surrounding the pool. Indeed, the water in sunken pools is generally contaminated by copper ions. These copper ions may be present in the water used for filling the pool or may be introduced subsequently into the water, for example by the corrosion of copper parts in contact with the water or by the addition of chemical products containing low quantities of copper to treat the water (such as algicides or disinfectants).

It is also known that anaerobic microorganisms which produce hydrogen sulfide grow in the ground surrounding sunken pools. These microorganisms can grow in microcracks present in the walls of the pool, and the hydrogen sulfide formed can react with the copper ions present in the water in the pool, to thus form copper sulfide which adheres to the walls of the pool, and forms black marks. In the case of a pool lined with a sealing coat, the anaerobic microorganisms can grow between the pool and the sealing coat, and the hydrogen sulfide formed can migrate through the coat and react with the copper ions present in the water in the pool.

SUMMARY OF THE INVENTION

The invention relates to a method which makes it possible to prevent this formation of black marks on the walls of sunken pools containing water contaminated by copper ions.

The invention therefore relates to a method for preventing the formation of black marks on the walls of sunken pools containing water contaminated by copper ions, which is characterized in that the water is treated using a metal sulfide having water solubility at least equal to the solubility of copper sulfide.

BRIEF DESCRIPTION OF THE DRAWING

The drawing illustrates a pool having a hydraulic circuit.

DETAILED DESCRIPTION OF THE INVENTION

In the method according to the invention, the term "the walls of sunken pools" is intended to denote all the walls, including the bottom of the pool.

In the method according to the invention, the term "water contaminated by copper ions" is intended to denote water which contains more than $10^{-6}$ mol of copper ions per liter.

The term "water solubility of the metal sulfide" is intended to denote the maximum quantity, in moles, of metal sulfide dissolved per liter of water. The metal sulfide employed in the method according to the invention is a sulfide having a water solubility at least equal to the water solubility of copper sulfide. In general, use is made of a metal sulfide having a moderate water solubility, so as to avoid contamination of this water. Preferably, use is made of a metal sulfide having a water solubility less than or equal to that of manganese sulfide. Cadmium, lead, cobalt, nickel, zinc, iron and manganese sulfides are particularly preferred. Zinc sulfide is more particularly preferred.

The purpose of the metal sulfide employed in the method according to the invention is to react with the copper ions present in the water in the pool and to precipitate the copper ions, in general in the form of a copper sulfide.

In the method according to the invention, the form in which the metal sulfide is present is arbitrary. It may, in particular, be present in the form of a finely divided powder, in the form of particles with a diameter of the order of a few micrometers, or even in the form of flakes or beads.

In the method according to the invention, the water treatment using the metal sulfide can take place in various ways. The treatment may, in particular, consist in pouring the metal sulfide into the water in the pool, or in arranging the metal sulfide in a container with openworked walls, which is immersed in the water in the pool. According to a preferred embodiment of the method according to the invention, the water in the pool is circulated over a bed of particles comprising the metal sulfide.

In the method according to the invention, the quantity of metal sulfide employed depends essentially on the copper ion concentration in the water in the pool. In general, the quantity of metal sulfide, expressed as moles of sulfur, is at least equal to the quantity, in moles, of copper ions present in the pool. Preferably, and more especially in the case when the copper ion concentration in the water can increase rapidly with time, the metal sulfide is used in excess with respect to the concentration of copper ions already present in the water in the pool, for example an excess of 10 times the copper ion concentration. According to one embodiment of the method according to the invention, and more especially in the case when the water in the pool is circulated over a bed of particles comprising the metal sulfide, the metal sulfide is used initially in a very great excess with respect to the concentration of copper ions already present in the water in the pool. The water in the pool can in this way be treated for several months without further addition of metal sulfide.

According to a variant of the method of the invention, the water treatment using metal sulfide is carried out in the presence of a flocculating agent. In general, the flocculating agent is selected from the hydroxides and chlorides of aluminum and iron. Preferably, the flocculating agent is a mixed compound of aluminum chloride and aluminum hydroxide. The purpose of the flocculating agent is to flocculate the copper sulfide and facilitate its separation from the water. The optimum quantity of flocculating agent will therefore depend on the level of copper ions in the water and on the nature of the metal sulfide selected. It is generally between 0.5 and 5 mg per liter of water.

The method according to the invention allows selective removal of the copper ions from the water in the pool. In particular, the method according to the invention makes it possible to reduce the quantity of copper ions to a level equal to or less than $10^{-6}$ mol per liter of water, and thus prevents the formation of black marks on the walls of sunken pools.

The method according to the invention is applicable to any sunken pool, and more especially to pools comprising walls of light color. The method is advantageously applicable to pools lined with a sealing coat, and more particularly to pools lined with a plasticized PVC coat.

The method according to the invention is more particularly applicable to swimming pools, and more especially to swimming pools lined with a PVC sealing coat. The PVC sealing coats used in swimming pools are generally blue, green, beige or white in color. In this particular application of the method according to the invention, the metal sulfide employed is generally zinc sulfide. Zinc sulfide has low toxicity for humans and its solubility is sufficiently low to prevent it from coloring the water or give it the smell of hydrogen sulfide. The use of zinc sulfide also makes it possible to remove the copper ions selectively without removing other useful ions such as calcium. In addition, the use of zinc sulfide does not lead to the formation of undesired marks; indeed, if zinc sulfide deposits were to form on the walls of the pools, these deposits would be white and therefore difficult to see on a light wall. They could moreover be removed easily using an acid solution. In this particular application of the method according to the invention, the zinc sulfide is advantageously used in the hydraulic circuit for disinfecting the water, upstream of the filter.

Particular features and details of the invention will emerge during the description of the appended FIGURE, which represents the layout of a pool to which a preferred embodiment of the method according to the invention is applied.

The pool (1) is sunk in the ground and has its walls lined with a PVC sealing coat (2). The pool is equipped with a hydraulic circuit (4) comprising one skimmer (5), a delivery nozzle (6), a sand filter (7) and a circulation pump (8). The zinc sulfide is introduced into the skimmer (5). A fraction of the water in the pool is dawn off continuously from the pool, via the skimmer (5), using the circulation pump (8). The copper ions present in this water fraction react with the zinc sulfide in the skimmer (5) and precipitate in the form of copper sulfide, which is retained on the sand filter (7). The water, purified of copper ions, is reinjected into the pool through the delivery nozzle (6).

EXAMPLES

The following example serves to illustrate the invention.
Example 1 (in accordance with the invention)

A sunken pool, as schematically represented in the above-described FIGURE, having a length of 9 m, a width of 5 m and a depth of 1.5 m and whose walls have been lined with a blue-colored PVC sealing coat, was filled with 65 $m^3$ of water containing a level of copper ions equal to $10^{-5}$ mol/liter.

The water flow rate in the hydraulic circuit (4) was 15 $m^3/h$. 100 g of zinc sulfide were introduced into the skimmer (5). After 14 days, the level of copper ions in the water in the pool was measured at $10^{-6}$ moles/liter.

Every three weeks, 50 g of zinc sulfide as well as 200 g of trichloroisocyanuric acid as disinfectant and 2 g of flocculating agent (mixed aluminum chloride and hydroxide salt) were added in the skimmer.

No black mark had appeared on the walls after the pool had been used for 24 months.

Example 2 (not in accordance with the invention)

After the pool had been used for 24 months, as described in example 1, the water treatment using zinc sulfide was stopped; the other treatment and operating conditions were maintained.

After 12 months, black marks were gradually appearing on the walls. The level of copper ions in the water in the pool was then measured at $5.10^{-6}$ mol/liter.

What is claimed is:

1. A method for preventing the formation of black marks on the walls of a sunken pool containing water contaminated by copper ions, comprising treating said water contaminated by copper ions by introducing zinc sulfide to said water, and reacting said copper ions with said zinc sulfide to precipitate said copper ions as copper sulfide.

2. The method according to claim 1, wherein the water in the pool is circulated over a bed of particles comprising zinc sulfide.

3. The method according to claim 1, wherein the water treatment using zinc sulfide is carried out in the presence of a flocculating agent.

4. The method according to claim 3, wherein the flocculating agent is a mixed compound of aluminum chloride and aluminum hydroxide.

5. The method according to claim 1, wherein said sunken pool is lined with a sealing coat.

6. The method according to claim 5, wherein the sealing coat is made of plasticized PVC.

7. The method according to claim 1, wherein said sunken pool is a swimming pool.

8. The method according to claim 1, including removing said copper sulfide from said contaminated water.

9. The method according to claim 1, wherein said contaminated water is treated by introducing zinc sulfide to said water outside of said sunken pool.

* * * * *